United States Patent Office.

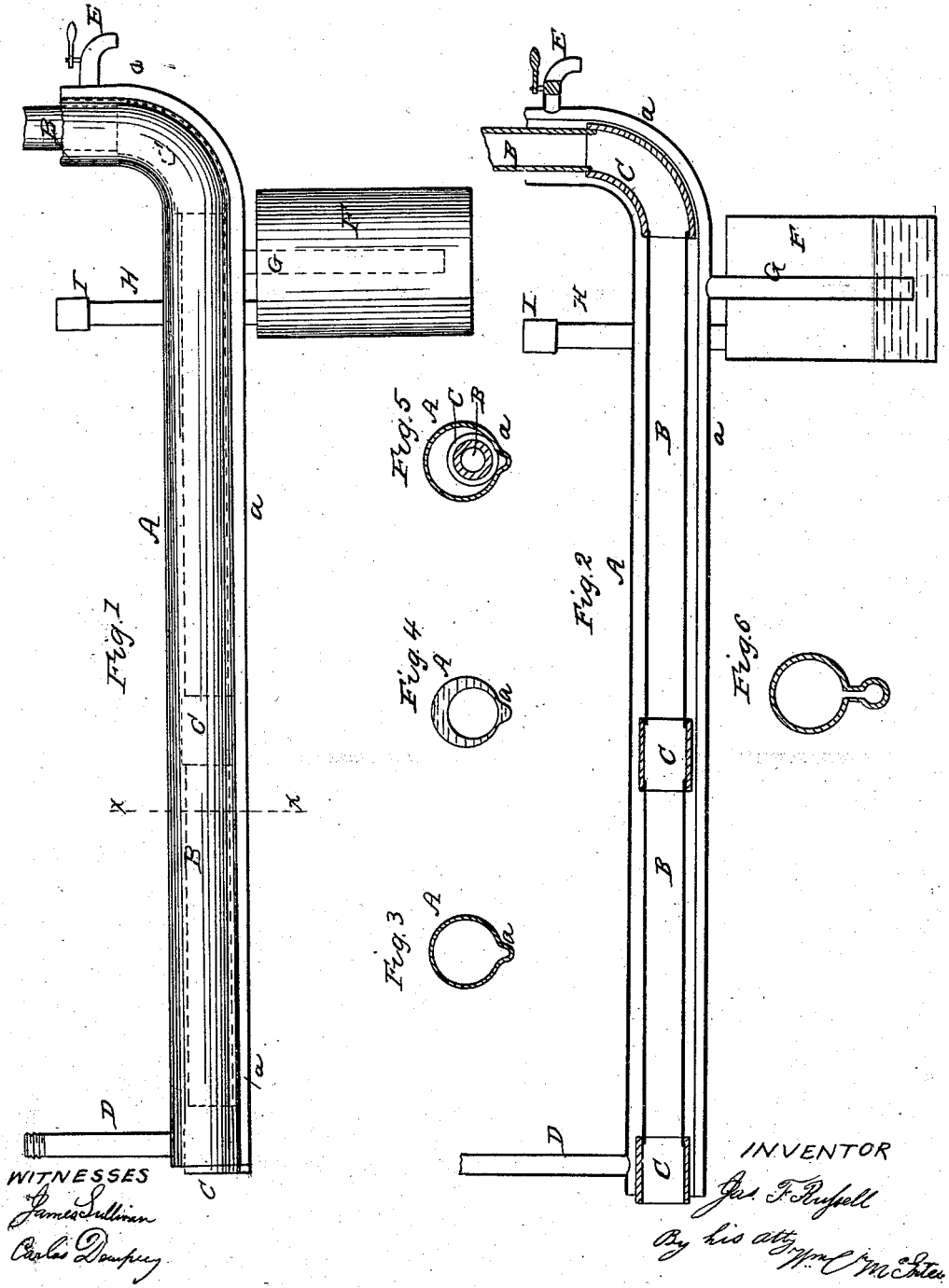

JAMES F. RUSSELL, OF WASHINGTON, DISTRICT OF COLUMBIA.

Letters Patent No. 70,365, dated October 29, 1867.

IMPROVED MODE OF FACILITATING THE FLOW OF ILLUMINATING GAS THROUGH PIPES.

*The Schedule referred to in these Letters Patent and making part of the same.*

TO ALL WHOM IT MAY CONCERN:

Be it known that I, JAMES F. RUSSELL, of Washington city, in the District of Columbia, have invented a new and useful Method of Facilitating the Flow of Illuminating Gas, Water, and other Fluids through Conducting Pipes; and I do hereby declare the following to be a full and exact description thereof, reference being had to the accompanying drawings, making part of this application.

My invention has for its object to render the flow of illuminating gas, water, or other fluids, through pipes which are subjected to a low temperature, more perfect, to prevent the accumulation of gummy substances, &c.; and consists in keeping the gas or conducting pipe always warm, in the manner hereinafter explained.

It is well known that one of the greatest impediments to the perfect flow of illuminating gas manufactured from gasoline, crude petroleum, &c., is the fact that it cannot be successfully distributed through a great length of pipe subjected to a low temperature without dropping a large portion of the hydrocarbon, which is essential as an illuminating agent, and it is to obviate this difficulty that forms the chief feature of my invention.

I will proceed to explain fully my invention, by referring to the accompanying drawings, in which similar letters of reference denote like parts in the different figures.

Figure 1 is a side view of a section of pipe encased and adapted for use.

Figure 2 is a longitudinal vertical section of the same.

Figure 3 is a cross-section of the outer or casing pipe.

Figure 4 is a view of the end attached to the gasometer or reservoir from which the flow is taken, showing the "drip," as will be presently explained.

Figure 5 is a cross-section at the line $x\, x$, fig. 1, showing the outer or casing pipe, the inner or gas pipe, and a joint of the same.

Figure 6 is a detail view showing a modification of the drip.

A is the outer or casing pipe; B, the inner or gas-conducting pipe; $a$, the drip which may be constructed as shown, or in any other manner thought best; C represents a joint in the gas pipe B, which is made in the usual manner; D is a pipe attached to the case pipe A by means of screw-threads or otherwise, at any convenient point, (though we deem it best to be adjacent to the gasometer or reservoir,) for the purpose of conducting steam, hot air, or equivalents into the case pipe. It will be observed that the case pipe is thoroughly closed at one end, that is to say, it fits close around the pipe near the gas-holder or reservoir. E is an escape, which is represented by a steam-cock. Of course we do not wish to limit ourselves to this mode of passing off the steam or hot air, as it may be carried off by a waste pipe into a sewer, flue, or other convenient place, the end of the case pipe being sealed, and the escape pipe attached. It will thus be seen that the steam or hot air passes in at one end, and, surrounding the inner pipe, follows it its whole length, and passes off, thus keeping up a continual current, whereby the inner or gas pipe is kept at an even temperature. F is what is known by those skilled as the "drip" receiver. They may be provided at various points along the route of the pipe to receive the condensed steam, where steam is used, or the absorption when hot air is used, or both, when the pipes are placed in the ground by being connected at various points, wherever it may be advisable or expedient, to the drip pipe. This "receiver" is provided with a pipe, H, which has a cap, I. This pipe is used for drawing off any surplus of water which may accumulate in the receiver, it being desirable that a certain quantity should remain, enough to extend up above the exit of the pipe G, thus preventing the escape of steam or hot air into the receiver. This water is drawn off by applying a "drip" pump to the pipe H. The dotted blue lines seen running crosswise of the receiver are intended to represent water. It will be understood that the outer or casing pipe not being necessarily strong, as the steam or hot air passing through flows unobstructed, meeting with no resistance except the pressure of the atmosphere at its exit, it may therefore be made of copper, zinc, or in fact any metal deemed most advisable, and spliced or joined in any manner known or devised.

It will be seen that my invention can be easily applied in large factories and buildings where steam or hot air, or both, are employed, as it is only necessary to make a connection with the steam-boiler or hot-air furnace, when a current immediately commences. Of course the connecting pipe may be furnished with a stop-cock, to be used if desired to cut off the flow. My invention is more particularly adapted to improving the flow of illuminating gas, manufactured from gasoline, petroleum, &c., but may be used for any other like purpose, where it is a desideratum to keep the inner pipe always at an even temperature of heat.

And now, having fully described my invention, what I claim as new, and desire to secure by Letters Patent, is—

The method herein described of heating and keeping at an even temperature gas, water, or other pipes, by allowing steam, hot air, &c., to pass in at one end of a case pipe, surround the inner pipe, and follow along its whole or partial extent, pass off in the manner substantially as described for the purpose set forth.

In testimony whereof I have hereunto set my hand and affixed my seal this 12th day of October, A. D. 1867.

JAMES F. RUSSELL. [L. S.]

Witnesses:
    WM. B. GURLEY,
    W. B. ORME.